(12) United States Patent
Vaidya et al.

(10) Patent No.: US 10,592,160 B1
(45) Date of Patent: Mar. 17, 2020

(54) SYSTEMS AND METHODS FOR MONITORING DATA SYNCHRONIZATION PROGRESS IN A MULTI-HOP DATA RECOVERY SYSTEM

(71) Applicant: Veritas Technologies LLC, Mountain View, CA (US)

(72) Inventors: Anish Vaidya, Pleasanton, CA (US); Sunil Hasbe, Anantpal (IN); Om Prakash Agarwal, Fremont, CA (US); Rushikesh Patil, Jalgaon (IN); Ashit Kumar, Muzaffarpur (IN); Venkata Sreenivasa Rao Nagineni, Mountain View, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 16/185,645

(22) Filed: Nov. 9, 2018

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
See application file for complete search history.

(56) References Cited

U.S. PATENT DOCUMENTS

| | | | | |
|---|---|---|---|---|
| 2012/0198175 A1* | 8/2012 | Atkisson | ............. | G06F 12/0804 711/135 |
| 2015/0378893 A1* | 12/2015 | Atkisson | ............. | G06F 12/0802 711/118 |
| 2016/0203053 A1* | 7/2016 | Talagala | ............. | H04L 67/1097 714/6.12 |
| 2017/0329684 A1* | 11/2017 | Lien | ....................... | G06F 3/0619 |

\* cited by examiner

*Primary Examiner* — Than Nguyen
(74) *Attorney, Agent, or Firm* — FisherBroyles, LLP

(57) ABSTRACT

The disclosed computer-implemented method for monitoring data synchronization progress in a multi-hop data recovery system may include (i) calculating a number of data blocks to be synchronized, (ii) setting each element of a synchronization data structure to dirty, (iii) determining a dirty bytes counter, (iv) transmitting a portion of the data blocks to be synchronized, (v) receiving an acknowledgement corresponding to the transmitted portion of the data blocks, (vi) setting a set of elements within the synchronization data structure corresponding to the transmitted portion of the data blocks to clean, (vii) determining a pending dirty bytes counter that indicates a current number of elements within the synchronization data structure that are set to dirty, and (viii) transmitting the dirty bytes counter and the pending dirty bytes counter. Various other methods, systems, and computer-readable media are also disclosed.

20 Claims, 5 Drawing Sheets

SYSTEMS AND METHODS FOR MONITORING DATA SYNCHRONIZATION PROGRESS IN A MULTI-HOP DATA RECOVERY SYSTEM

BACKGROUND

Data recovery systems may be used in disaster recovery scenarios. For example, if a computing device or node of the system malfunctions or is otherwise unavailable, the data recovery system may mitigate the damage. A data recovery system may enable migration and recovery of on-premise assets (e.g., virtual machine (VM) or physical machine) into public, private, or hybrid cloud computing systems or into a traditional recovery data center. Once an asset is protected, the data recovery system may replicate the entire asset, over one or more networks, while the asset is executing in the primary data center and applications are executing on the asset. For a thin provisioned VM, the data recovery system may replicate only the used or allocated blocks to the secondary storage system, not the entire provisioned space for the VM.

To perform a data recovery operation on the asset, including rehearsal, migration, or takeover operations, the data typically must be synchronized to a recovery site. While the data recovery system replicates the data, the user may have to wait until the initial full synchronization is complete and the target is consistent with the original. However, traditional data recovery systems may not be able to provide an accurate estimate for the data synchronization progress. The instant disclosure, therefore, identifies and addresses a need for systems and methods for monitoring data synchronization progress in a multi-hop data recovery system.

SUMMARY

As will be described in greater detail below, the instant disclosure describes various systems and methods for monitoring data synchronization progress in a multi-hop data recovery system.

In one example, a method for monitoring data synchronization progress in a multi-hop data recovery system may include (i) calculating, by a computing device, a number of data blocks to be synchronized, (ii) setting each element of a synchronization data structure to dirty, (iii) determining a dirty bytes counter that indicates a number of elements within the synchronization data structure that are set to dirty, (iv) transmitting a portion of the data blocks to be synchronized, (v) receiving an acknowledgement corresponding to the transmitted portion of the data blocks, (vi) setting a set of elements of the synchronization data structure corresponding to the transmitted portion of the data blocks to clean, (vii) determining a pending dirty bytes counter that indicates a current number of elements within the synchronization data structure that are set to dirty, and (viii) transmitting the dirty bytes counter and the pending dirty bytes counter.

In some examples, the method may include receiving an indication to initiate a full synchronization of data. In some examples, the synchronization data structure and an active data structure may be merged. The active data structure may correspond to new data blocks from an application of the computing device. A gateway may receive the dirty bytes counter, the pending dirty bytes counter, and a synchronization start time. An estimated time of arrival (ETA) of the data blocks to be synchronized may be calculated using the dirty bytes counter, the pending dirty bytes counter, and the synchronization start time. A synchronization progress of the data blocks to be synchronized may be calculated using the dirty bytes counter and the pending dirty bytes counter. In some examples, the method may include (i) transmitting another portion of the data blocks to be synchronized, (ii) receiving another acknowledgement corresponding to the other portion of the data blocks, (iii) setting another set of elements of the synchronization data structure corresponding to the other portion of the data blocks to clean, (iv) updating the pending dirty bytes counter to an updated number of elements of the synchronization data structure set to dirty based on the other portion of the data blocks, and (v) transmitting the dirty bytes counter and the updated pending dirty bytes counter.

In one example, a system for monitoring data synchronization progress in a multi-hop data recovery system may include a computing device comprising at least one physical processor and physical memory comprising computer-executable instructions that, when executed by the at least one physical processor, may cause the computing device to (i) calculate a number of data blocks to be synchronized, (ii) set each element of a synchronization data structure to dirty, (iii) determine a dirty bytes counter that indicates a number of elements within the synchronization data structure that are set to dirty, (iv) transmit a portion of the data blocks to be synchronized, (v) receive an acknowledgement corresponding to the transmitted portion of the data blocks, (vi) set a set of elements of the synchronization data structure corresponding to the transmitted portion of the data blocks to clean, (vii) determine a pending dirty bytes counter that indicates a current number of elements within the synchronization data structure that are set to dirty, and (viii) transmit the dirty bytes counter and the pending dirty bytes counter.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) calculate a number of data blocks to be synchronized, (ii) set each element of a synchronization data structure to dirty, (iii) determine a dirty bytes counter that indicates a number of elements within the synchronization data structure that are set to dirty, (iv) transmit a portion of the data blocks to be synchronized, (v) receive an acknowledgement corresponding to the transmitted portion of the data blocks, (vi) set a set of elements of the synchronization data structure corresponding to the transmitted portion of the data blocks to clean, (vii) determine a pending dirty bytes counter that indicates a current number of elements within the synchronization data structure that are set to dirty, and (viii) transmit the dirty bytes counter and the pending dirty bytes counter.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
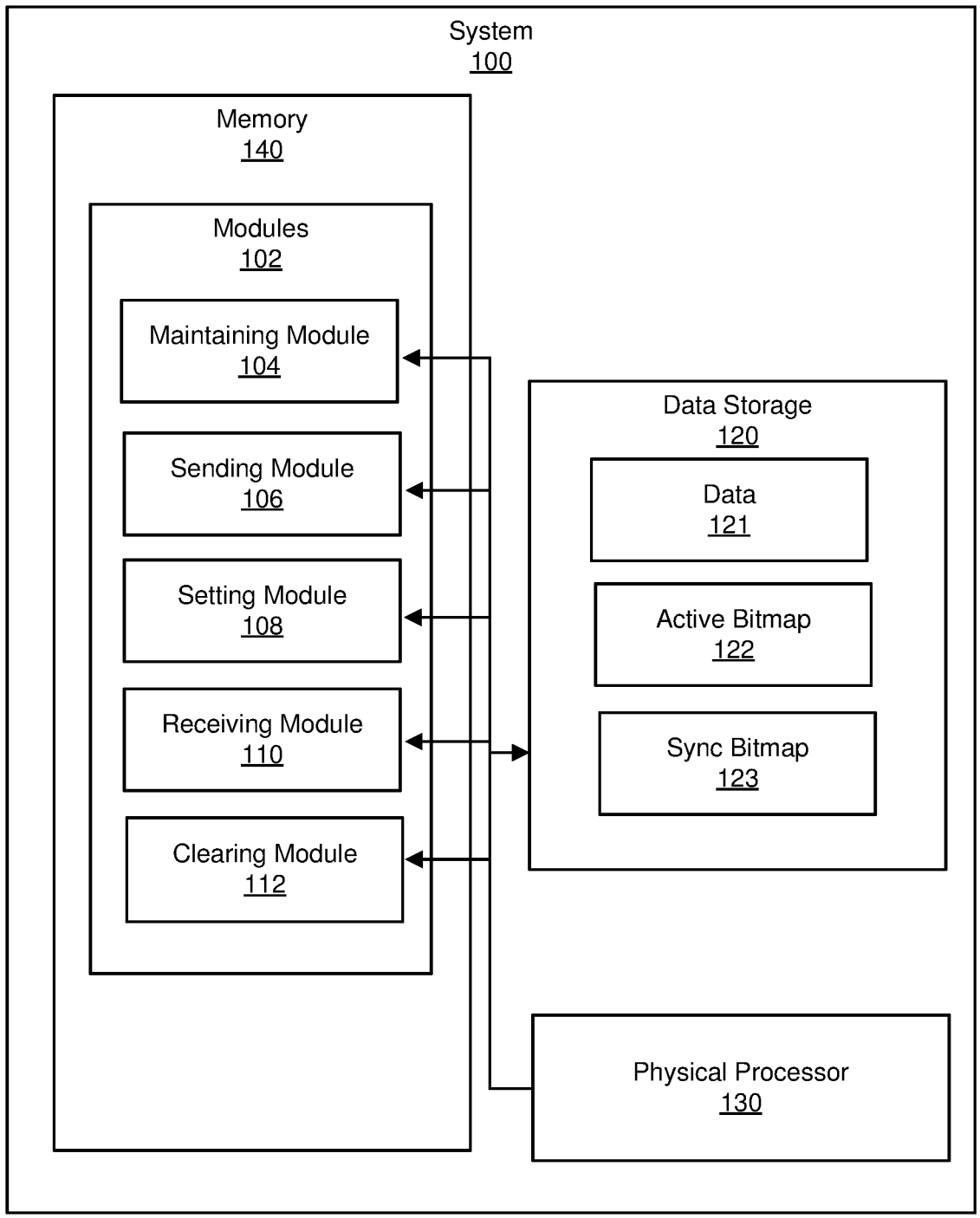
FIG. 1 is a block diagram of an example system for monitoring data synchronization progress in a multi-hop data recovery system.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for monitoring data synchronization progress in a multi-hop data recovery system. In some examples, the data recovery system may include modules on a source virtual machine (VM) or hypervisor, which may intercept inputs/outputs (IOs) from the VM or applications executing on the VM or hypervisor. The modules may transmit the IOs to an aggregator appliance, such as a source gateway located at the site of the source VM or hypervisor. The source gateway may optimize the IOs, including local deduplication (e.g., write cancellation) and compression, before sending the IOs to a remote recovery site. Although the IOs data may be intended for consumption by a peer gateway in the remote recovery site, there could be an additional hop (e.g., an additional gateway device, such as an S3 object storage gateway). With or without this additional hop, the gateway at the remote recovery site may receive the IO data, assemble the IOs, and apply the data to a target device in the remote recovery site. Thus, the data recovery system may include multiple hops, which may include, but is not limited to, the protected host/source VM, a gateway device located at the primary site, an optional gateway (e.g., object store), the gateway device at the remote recovery site, and/or the remote storage device at the remote recovery site.

The factors influencing the multi-hop replication architecture may pose a unique challenge in arriving at an accurate estimated time of arrival (ETA) of data to be synchronized at any of these hops. Further, some of the factors (e.g., network bandwidth and active IO rate) may change over time. The systems and methods described herein may, therefore, be directed to calculating an accurate ETA and synchronization progress predictions. In some embodiments, the ETA and data synchronization progress may be based on historical data as the synchronization progresses through the data recovery system.

In some examples, the phase of initial full synchronization and the phase of incremental or differential synchronization may need to be handled differently, as the full synchronization may be intentional while the incremental or differential synchronization may correct any unintentional breaks in the infrastructure of the data recovery system. Accordingly, the systems and methods described herein may enable the ETA and data synchronization progress to be calculated at any point in time and at each hop of the replication environment. As described herein, multiple factors, including thin provisioned VMs and active IO load, may be taken into consideration for such calculations. The systems and methods described herein are designed to provide resiliency to the frequent failures in network or infrastructure. In some examples, the ETA may be calculated based on historical data using predictive analysis In some examples, the systems and methods described herein may include techniques to maintain the number of dirty bytes and the number of pending dirty bytes on a source device during data synchronization (e.g., full data synchronization or incremental or differential synchronization). These values may be shared with the downstream components/hops of the data recovery system. Each hop may individually calculate the data synchronization progress and ETA based on these pending dirty bytes, dirty bytes, and the time it took to synchronize from the start time of the synchronization.

Figure 2:
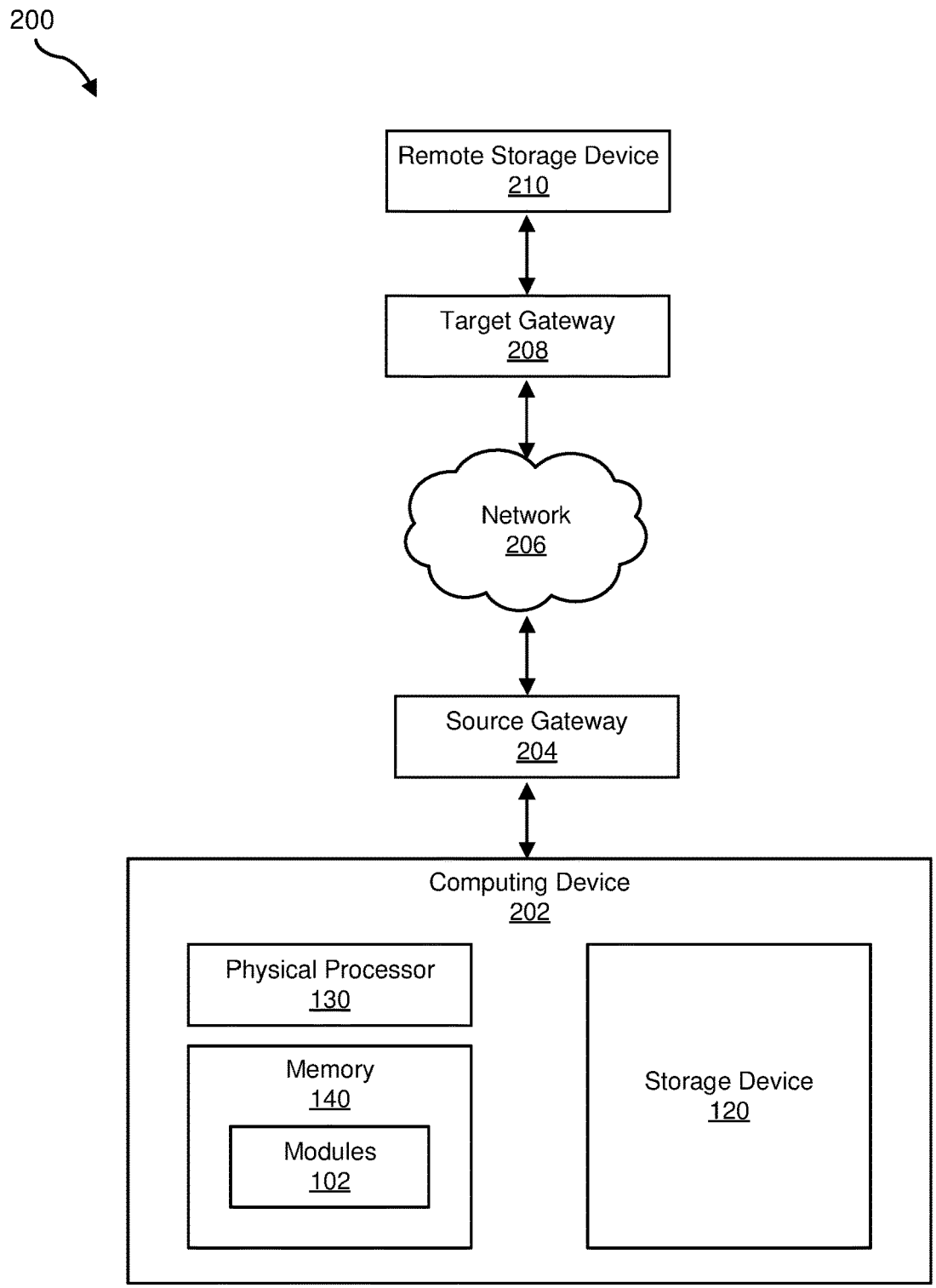
FIG. 2 is a block diagram of an additional example system for monitoring data synchronization progress in a multi-hop data recovery system.

The following will provide, with reference to FIGS. 1-2, detailed descriptions of example systems for monitoring data synchronization progress in a multi-hop data recovery system. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 4-5, respectively.

FIG. 1 is a block diagram of an example system 100 for monitoring data synchronization progress in a multi-hop data recovery system. As illustrated in this figure, example system 100 may include one or more modules 102 for performing one or more tasks. As will be explained in greater detail below, modules 102 may include a maintaining module 104, a sending module 106, a setting module 108, a receiving module 110, and a clearing module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, source gateway 204, target gateway 208, and/or remote storage device 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate monitoring data synchronization progress in a multi-hop data recovery system. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As illustrated in FIG. 1, example system 100 may also include data storage 120. Data storage 120 generally represents any type or form of computing device capable of data storage. In one example, data storage 120 may store data 121, an active bitmap 122, and synchronization (sync) bitmap 123.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a source gateway 204, a network 206, a target gateway 208, and a remote storage device 210. In examples, devices coupling computing device 202 with remote storage device 210 constitute a replication path on which replication data is communicated. In one example, all or a portion of the functionality of modules 102 may be performed by computing device 202 and/or any other suitable computing system. In examples, replication components, such as constituent devices of example system 200, may be distributed over multiple systems and/or multiple disk staging devices. In some examples, replication components may be configured in a cascaded topology. As will be described in greater detail herein, one or more of modules 102 from FIG. 1 may, when executed by at least one processor of computing device 202, enable computing device 202 to manage replication of data to remote storage device 210. In examples, replication may include continuous replication.

Computing device 202 generally represents any type or form of computing device capable of reading computer-executable instructions. For example, computing device 202 may represent an endpoint device running client-side software, such as an application node. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, storage servers, database servers, application servers, and/or web servers configured to run certain software applications and/or provide various storage, database, and/or web services variations or combinations of one or more of the same, or any other suitable computing device.

Source gateway 204 generally represents any type or form of computing device capable of connecting a local area network (LAN) to a different network (e.g., the Internet). In examples, source gateway 204 may filter or route data. In examples, source gateway 204 may include a storage device for caching data passing through source gateway 204. In some examples, source gateway 204 may couple computing device 202 to network 206, and thus to target gateway 208 and remote storage device 210.

Network 206 generally represents any medium or architecture capable of facilitating communication or data transfer. In one example, network 206 may facilitate communication between computing device 202 and remote storage device 210. In this example, network 206 may facilitate communication or data transfer using wireless and/or wired connections. Examples of network 206 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Target gateway 208 generally represents any type or form of computing device capable of connecting another LAN to different network (e.g., the Internet). In some examples, target gateway 208 may filter or route data. In examples, target gateway 208 may include a storage device for caching data passing through target gateway 208. In some examples, target gateway 208 may connect network 206 to remote storage device 210.

Remote storage device 210 generally represents any type or form of volatile or non-volatile storage device or medium capable of storing data and/or computer-readable instructions. In examples, remote storage device 210 may store replication data received from computing device 202. In examples, remote storage device 210 may be located remotely from computing device 202. Examples of remote storage device 210 include, without limitation, Random Access Memory (RAM), Read Only Memory (ROM), flash memory, Hard Disk Drives (HDDs), Solid-State Drives (SSDs), optical disk drives, caches, cloud-based storage devices, storage servers, database servers, application servers, and/or web servers configured to run certain software applications and/or provide various storage, database, and/or web services, variations or combinations of one or more of the same, and/or any other suitable storage memory.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced herein may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
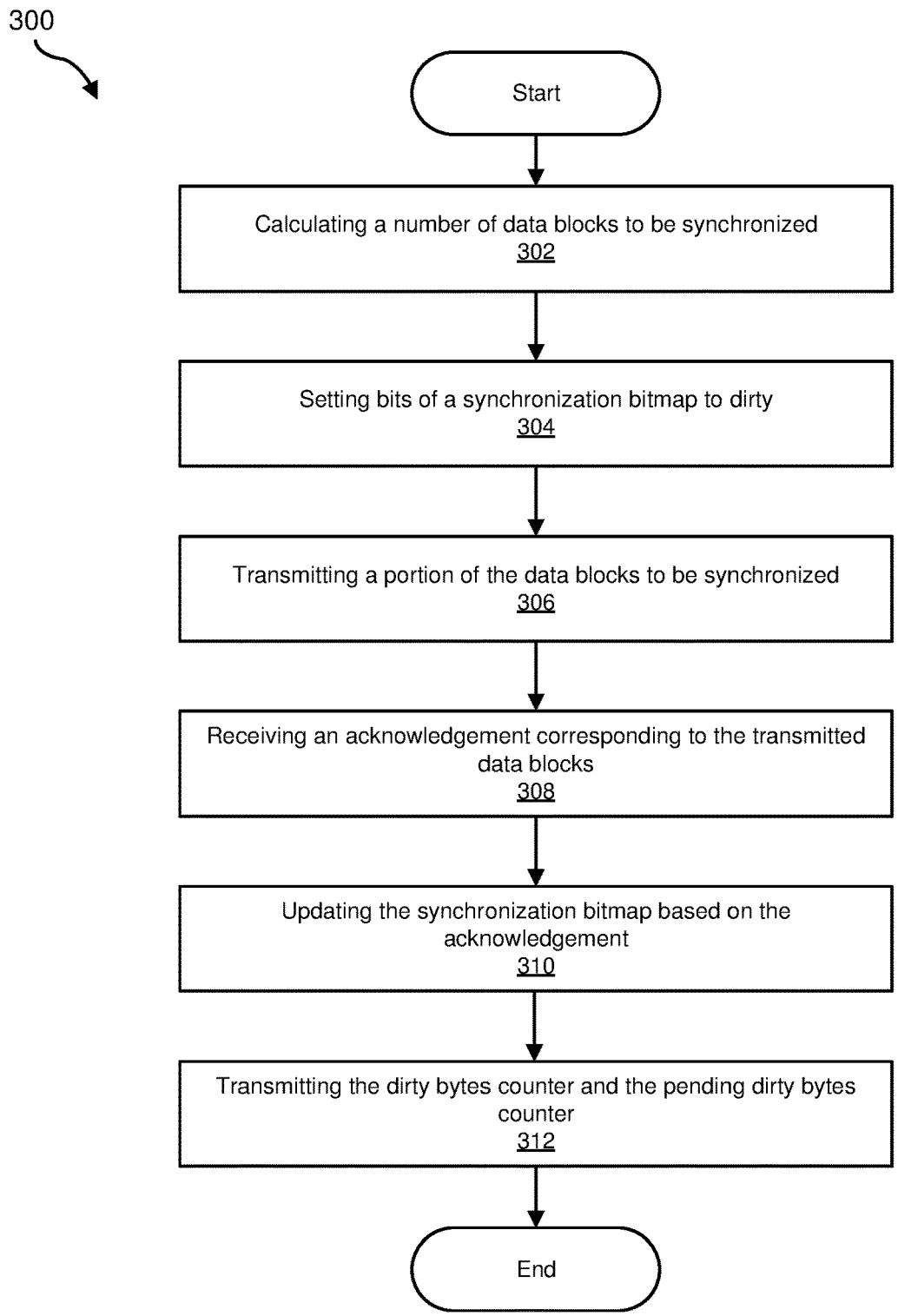
FIG. 3 is a flow diagram of an example method for monitoring data synchronization progress in a multi-hop data recovery system.

FIG. 3 is a flow diagram of an example computer-implemented method 300 for monitoring data synchronization progress in a multi-hop data recovery system. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may calculate a number of data blocks to be synchronized. In some examples, the data recovery system may facilitate different types of data synchronizations. For example, a user may request an initial full data synchronization. This type or phase of data synchronization may only need to be performed once. The phase may be required to be completed and the data synchronization with the remote storage device 210 may need to be completed before any data recovery operation may be performed. In another example, an incremental or differential synchronization may be executed. This type or phase of data synchronization may be performed after the initial full synchronization and the data in the remote storage device 210 is consistent with the data in the computing device 202. If there is a temporary break in the network 206 or data recovery infrastructure, the maintaining module 104 and/or the setting module 108 may record the changes performed by the application in the active bitmap 122 and transmit those changes to the remote storage device 210 when the infrastructure is healthy. This phase may not be initiated by the user but may need to be carried out when required in order to keep data consistent on the recovery site.

In some examples, an indication to initiate a full synchronization of data may be received from a user of the computing device 202. In some examples, the data recovery system may initiate an incremental or differential data synchronization based on changes in the data to be synchronized, detection of inconsistent data between the computing device 202 and the remote storage device 210, or the like.

At step 302, one or more of the systems described herein may calculate a number of data blocks to be synchronized. In some examples, the receiving module 110 may receive an indication from the user of the computing device 202 for a full data synchronization. The maintaining module 104, in response to the indication, may determine the size of the data 121 to be synchronized. The maintaining module 104 may determine the size of the data 121 and determine a number of data blocks to be synchronized. In some examples, the maintaining module 104 may track the data to be synchronized and the progress of the data transmitted for synchronization using data structures, such as bitmaps. The maintaining module 104 may utilize elements of data structures (e.g., bits of a bitmap) and changing the status of the elements of the data structures (e.g., marking bits of a bitmap as either dirty or clean) to track the progress of the data transmitted to other devices. For example, the maintaining module 104 may determine the number of dirty bytes of the sync bitmap 123 based on the size of the data 121. A dirty bytes counter may be determined when the full data synchronization is initiated. The value of the dirty bytes counter may not be recalculated until the full synchronization is complete, which may involve multiple sync cycles and assumes that the size of the protected asset is not going to increase between sync cycles. An exception to this may occur if the value of pending dirty bytes counter of the sync bitmap 123 is greater than the value of the dirty bytes counter of the sync bitmap 123, at which point the value of the dirty bytes counter is set to the value of the pending dirty bytes counter of the sync bitmap 123. This may occur when an application of the source VM has performed an IO outside of the original allocation and while there was a break in infrastructure of the data recovery system.

As used herein, the term "bitmap" may refer to a technique for storing data describing a status of data sent from a source device (e.g., computing device 202) to a gateway, such as a source gateway and/or a target gateway. A bit and/or combination of bits in a bitmap may be associated with specific data to be synchronized. A bitmap may also be associated with data sent to a specific gateway.

The term "synchronization bitmap" or "sync bitmap," as used herein, may refer to a bitmap maintained by a source device used to track the progress of data synchronization for data from the source device to a device of the data recovery system (e.g., gateway at the recovery site). The bitmap may include dirty and clean bits, where the dirty bits may represent data blocks that need to be synchronized to other devices, whereas the clean bits may represent data blocks that have been synchronized to other devices. In some examples, during the initial full synchronization of the source device, the synchronization bitmap 123, which may represent the blocks used by the source VM or hypervisor, may all be set to dirty. This may be done on both thick or thin provisioned source VMs.

The term "active bitmap," as used herein, may refer to a bitmap maintained by the source device and used to track data for an application IO of a source VM or hypervisor that may be used (e.g., are created and need to be synchronized) during a synchronization cycle. The bits of the active bitmap 122 may be set to dirty and the data may be sent to an external device for data synchronization. The bits of both the active bitmap 122 and sync bitmap 123 may be set to clean when an acknowledgement is received from a remote storage device indicating that the transmitted data has been secured on the remote storage device.

The dirty bytes counter and the pending dirty bytes counter of the active bitmap 122 and the sync bitmap 123 may be calculated by totaling the number of bits set to dirty once the data synchronization begins. In some examples, the active bitmap 122 and the sync bitmap 123 are merged for this calculation. Whereas the number of dirty bytes will likely not change during the sync cycle, the data may decrease the pending dirty bytes sent to the next hop.

At step 304, one or more of the systems described herein may set the bits of the synchronization bitmap to dirty. In some examples, the setting module 108 may set the bits of the sync bitmap 123 to dirty. At the beginning the data synchronization, all the bits of the sync bitmap 123 may be set to dirty. In some examples, the bits of the active bitmap 122 may also be set to dirty. The dirty bytes counter may correspond to the number of bits of the sync bitmap 123 (and in some cases, both the sync bitmap 123 and the active bitmap 122) set to dirty.

At step 306, one or more systems described herein may transmit a portion of the data blocks of the data 121 to be synchronized. For example, the sending module 106, may transmit a portion of the data blocks of the data 121 to be synchronized. The data blocks may be initially transmitted to the source gateway 204 and ultimately transmitted to the remote storage device 210 via any intermediary hops or devices (e.g., target gateway 208).

At step 308, one or more systems described herein may receive an acknowledgement corresponding to the transmitted data blocks. In some examples, the receiving module 110 may receive the acknowledgement from one of the devices of the data recovery system (e.g., source gateway 204, target gateway 208, and/or remote storage device 210).

At step 310, one or more systems described herein may update the synchronization bitmap based on the acknowledgement. For example, in response to receiving the acknowledgement, the clearing module 112 may set a set of bits of the synchronization bitmap 123 corresponding to the transmitted portion of the data blocks to clean. The maintaining module may update the pending dirty bytes counter. The pending dirty bytes counter may indicate a current number of bits of the synchronization bitmap 123 set to dirty (or active bitmap 122) and are awaiting data synchronization.

The dirty bytes counter and the pending dirty bytes counter may be calculated by totaling the number of bits set to dirty of the active bitmap 122 and sync bitmap 123. Whereas the number of dirty bytes may not change over the sync cycle, the pending dirty bytes may be decreased when the data is sent to the next hop. Calculations for the dirty bytes counter and the pending dirty bytes counter may be as follows:

Dirty bytes counter=number of dirty bits in bitmaps (e.g., sync bitmap 123 and active bitmap 122) at the start of sync cycle×block size of data 121 to be synchronized.

Pending dirty bytes counter=number of current dirty bits in bitmaps (e.g., sync bitmap 123 and active bitmap 122)× block size of data 121 to be synchronized.

At step 312, one or more systems described herein may transmit the dirty bytes counter and the pending dirty bytes counter. In some examples, the dirty bytes counter may include the total dirty bytes per disk and may be transmitted (e.g., by the sending module 106) when the data synchronization starts. The synchronization start time may also be transmitted. In some examples, the pending dirty bytes counter may include the total dirty bytes per disk and may be transmitted (e.g., by the sending module 106) periodically during the data synchronization.

In some examples, one or more of the devices of the data recovery system (e.g., source gateway 204, target gateway 208, and/or remote storage device 210) may receive the dirty bytes counter, the pending dirty bytes counter, and a synchronization start time. The synchronization start time may be the time at which the data synchronization was started. The device may calculate an estimated time of arrival (ETA) of the data blocks to be synchronized using the dirty bytes counter, the pending dirty bytes counter, and the synchronization start time. In some examples, the ETA may be calculated using the following formula: ETA=pending dirty bytes counter*(current time−synchronization start time)/ (dirty bytes counter−pending dirty bytes counter).

In some examples, the device may calculate a synchronization progress of the data blocks to be synchronized using the dirty bytes counter and the pending dirty bytes counter. In some examples, the synchronization progress may be calculated using the following formula: Synchronization progress=(dirty bytes counter−pending dirty bytes counter)× 100/dirty bytes counter.

In some examples, the sending module 106 may transmit another portion of the data blocks of the data 121 to be synchronized. The receiving module 110 may receive another acknowledgement corresponding to the transmitted another portion of the data blocks. The setting module 108 may set another set of bits of the synchronization bitmap 123 corresponding to the transmitted portion of the data blocks to clean. The maintaining module 104 may update the pending dirty bytes counter. The pending dirty bytes counter may be updated to an updated number of bits of the synchronization bitmap 123 set to dirty based on the transmitted another set of data blocks. The sending module 106 may transmit the dirty bytes counter and the pending dirty bytes counter.

In some examples, the dirty bytes counter and pending dirty bytes counter may be determined and/or updated by the maintaining module 104 and transmitted, by the sending module 106, downstream, at any point in time. Thus, the user may receive an accurate calculation of the replication progress of the data recovery system. Each hop or device of the data recovery system may periodically calculate a respective current ETA and synchronization progress and store the calculations in a database.

In some examples, the ETA may be normalized based on the synchronization progress and then the normalized ETA may be used to predict a more accurate ETA using, for example, the Holtz Double Exponential Smoothing Algorithm. The normalized ETA sample points may be used to predict the ETA using statistical algorithms.

The systems and methods described herein are directed to monitoring data synchronization progress in a multi-hop recovery system. In some examples, the data synchronization progress may be based on user intent and may be determined at any point in a multi-hop system regardless of frequent breaks in the network and replication infrastructure. The system may calculate an accurate estimate of the time required to complete an initial data transfer of a protected virtual machine being replicated by a data recovery system. Many factors, such as position in the recovery system, network bandwidth, and the like, may influence the estimate. The systems and methods described herein may accommodate the changing nature of such factors by incorporating a historical trend in predicting the estimate. Any break in network or replication infrastructure, after the initial transfer, may require differential synchronization, which may also be estimated by the systems and methods described herein.

Figure 4:
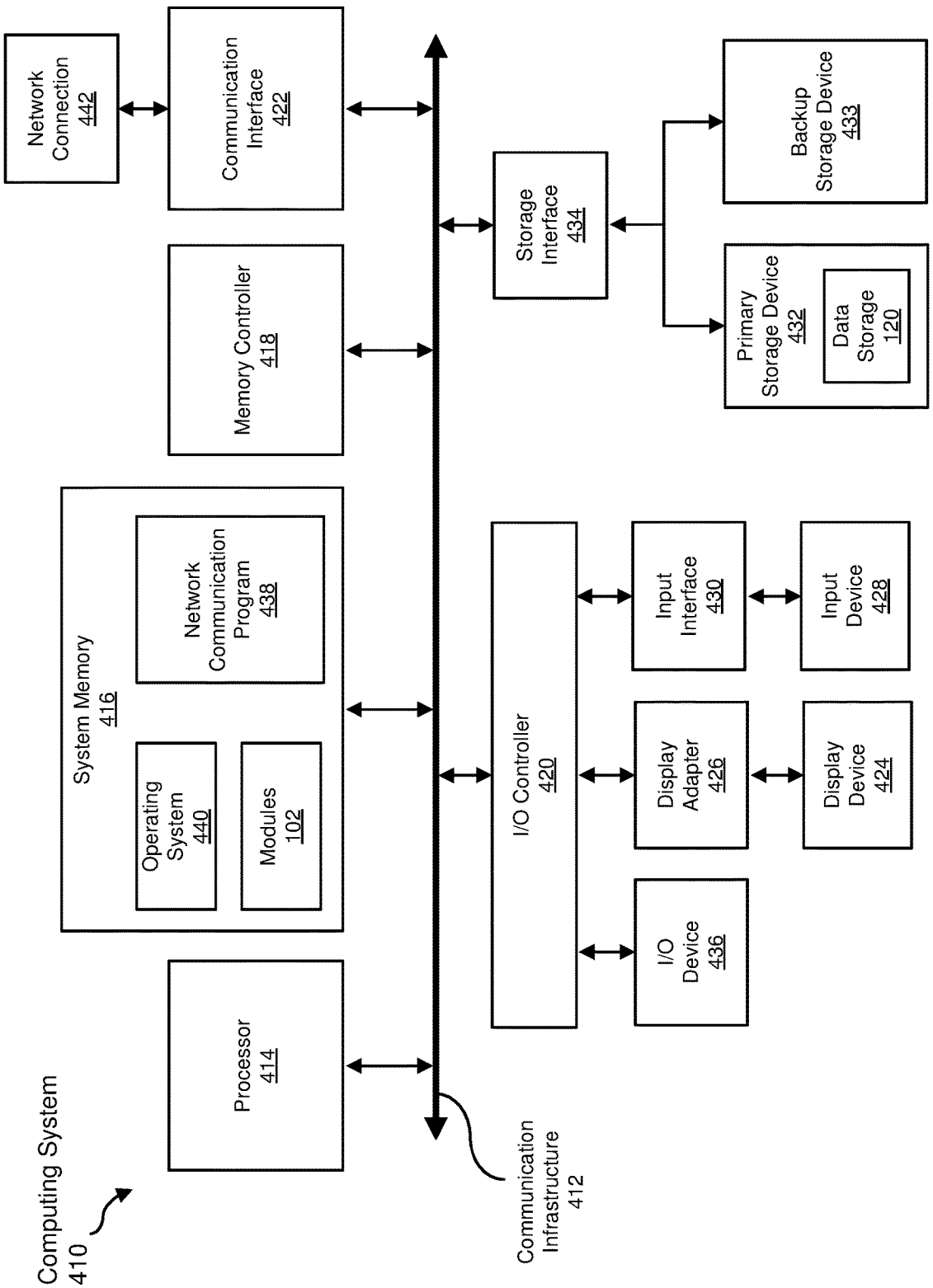
FIG. 4 is a block diagram of an example computing system capable of implementing one or more of the embodiments described and/or illustrated herein.

FIG. 4 is a block diagram of an example computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the example embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In some examples, system memory 416 may store and/or load an operating system 440 for execution by processor 414. In one example, operating system 440 may include and/or represent software that manages computer hardware and software resources and/or provides common services to computer programs and/or applications on computing system 410. Examples of operating system 440 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

As illustrated in FIG. 4, computing system 410 may also include at least one display device 424 coupled to I/O controller 420 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, example computing system 410 may also include at least one input device 428 coupled to I/O controller 420 via an input interface 430. Input device 428 generally represents any type or form of input device capable of providing input, either computer or human generated, to example computing system 410. Examples of input device 428 include, without limitation, a keyboard, a pointing device, a speech recognition device, variations or combinations of one or more of the same, and/or any other input device.

Additionally or alternatively, example computing system 410 may include additional I/O devices. For example, example computing system 410 may include I/O device 436. In this example, I/O device 436 may include and/or represent a user interface that facilitates human interaction with computing system 410. Examples of I/O device 436 include, without limitation, a computer mouse, a keyboard, a monitor, a printer, a modem, a camera, a scanner, a microphone, a touchscreen device, variations or combinations of one or more of the same, and/or any other I/O device.

Communication interface 422 broadly represents any type or form of communication device or adapter capable of facilitating communication between example computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one example, communication interface 422 may provide a direct connection to a remote storage device via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

In some examples, system memory 416 may store and/or load a network communication program 438 for execution by processor 414. In one example, network communication program 438 may include and/or represent software that enables computing system 410 to establish a network connection 442 with another computing system (not illustrated in FIG. 4) and/or communicate with the other computing system by way of communication interface 422. In this example, network communication program 438 may direct the flow of outgoing traffic that is sent to the other computing system via network connection 442. Additionally or alternatively, network communication program 438 may direct the processing of incoming traffic that is received from the other computing system via network connection 442 in connection with processor 414.

Although not illustrated in this way in FIG. 4, network communication program 438 may alternatively be stored and/or loaded in communication interface 422. For example, network communication program 438 may include and/or represent at least a portion of software and/or firmware that is executed by a processor and/or Application Specific Integrated Circuit (ASIC) incorporated in communication interface 422.

As illustrated in FIG. 4, example computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, data 121, active bitmap 122, and sync bitmap 123 from FIG. 1 may be stored and/or loaded in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 410 may be configured as an Application Specific Integrated Circuit (ASIC) adapted to implement one or more of the example embodiments disclosed herein.

Figure 5:
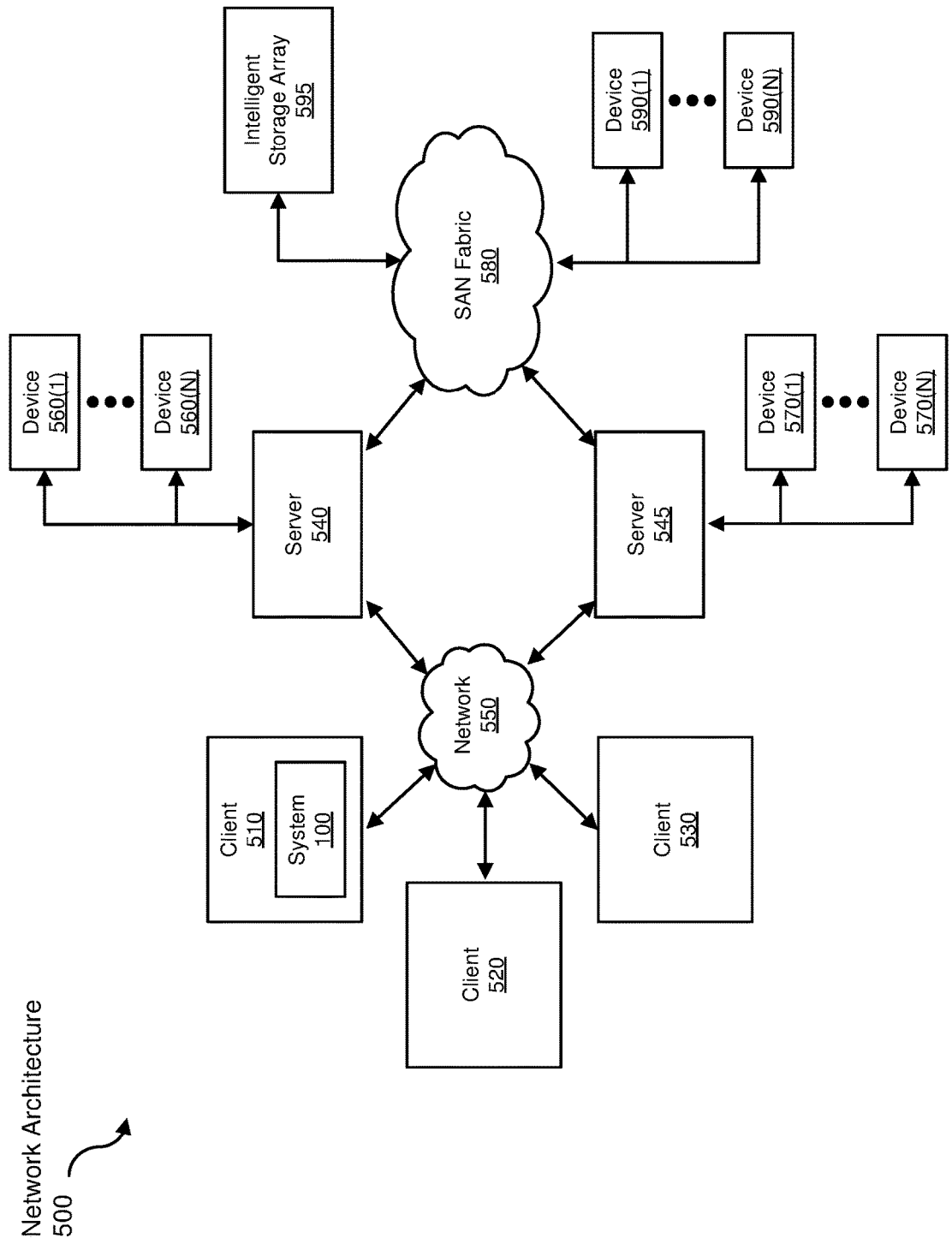
FIG. 5 is a block diagram of an example computing network capable of implementing one or more of the embodiments described and/or illustrated herein.

FIG. 5 is a block diagram of an example network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as example computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to example computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the example embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an example method for monitoring data synchronization progress in a multi-hop data recovery system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for monitoring data synchronization progress in a multi-hop data recovery system, at least a portion of the method being performed by a computing device comprising at least one processor, the method comprising:
   calculating, by a computing device, a number of data blocks to be synchronized;
   setting each element of a synchronization data structure to dirty;
   determining a dirty bytes counter, wherein the dirty bytes counter indicates a number of elements of the synchronization data structure that are set to dirty;
   transmitting a portion of the data blocks to be synchronized;
   receiving an acknowledgement corresponding to the transmitted portion of the data blocks;
   setting a set of bits of the synchronization data structure corresponding to the transmitted portion of the data blocks to clean;
   determining a pending dirty bytes counter, wherein the pending dirty bytes counter indicates a current number of elements of the synchronization data structure that are set to dirty; and
   transmitting the dirty bytes counter and the pending dirty bytes counter.

2. The computer-implemented method of claim 1, further comprising:
   receiving an indication to initiate a full synchronization of data.

3. The computer-implemented method of claim 1, further comprising:
   merging the synchronization data structure and an active data structure, wherein the active data structure corresponds to new data blocks from an application of the computing device.

4. The computer-implemented method of claim 1, further comprising:
   receiving, by a gateway, the dirty bytes counter, the pending dirty bytes counter, and a synchronization start time.

5. The computer-implemented method of claim 4, further comprising:
   calculating an estimated time of arrival (ETA) of the data blocks to be synchronized using the dirty bytes counter, the pending dirty bytes counter, and the synchronization start time.

6. The computer-implemented method of claim 4, further comprising:
   calculating a synchronization progress of the data blocks to be synchronized using the dirty bytes counter and the pending dirty bytes counter.

7. The computer-implemented method of claim 1, further comprising:
   transmitting another portion of the data blocks to be synchronized;
   receiving another acknowledgement corresponding to the other portion of the data blocks;
   setting another set of elements of the synchronization data structure corresponding to the other portion of the data blocks to clean;
   updating the pending dirty bytes counter to an updated number of elements of the synchronization data structure set to dirty based on the other portion of the data blocks; and transmitting the dirty bytes counter and the pending dirty bytes counter.

8. A system for monitoring data synchronization progress in a multi-hop data recovery system, the system comprising:
   a computing device comprising at least one physical processor; and
   physical memory comprising computer-executable instructions that, when executed by the at least one physical processor, cause the computing device to:
      calculate a number of data blocks to be synchronized;
      set each element of a synchronization data structure to dirty;
      determine a dirty bytes counter, wherein the dirty bytes counter indicates a number of elements of the synchronization data structure that are set to dirty;
      transmit a portion of the data blocks to be synchronized;
      receive an acknowledgement corresponding to the transmitted portion of the data blocks;
      set a set of elements of the synchronization data structure corresponding to the transmitted portion of the data blocks to clean;
      determine a pending dirty bytes counter, wherein the pending dirty bytes counter indicates a current number of elements of the synchronization data structure that are set to dirty; and
      transmit the dirty bytes counter and the pending dirty bytes counter.

9. The system of claim 8, wherein the computer-executable instructions further cause the computing device to:
   receive an indication to initiate a full synchronization of data.

10. The system of claim 8, wherein the computer-executable instructions further cause the computing device to:
    merge the synchronization data structure and an active data structure, wherein the active data structure corresponds to new data blocks from an application of the computing device.

11. The system of claim 8, wherein the computer-executable instructions further cause the computing device to:
    receive, by a gateway, the dirty bytes counter, the pending dirty bytes counter, and a synchronization start time.

12. The system of claim 11, wherein the computer-executable instructions further cause the computing device to:
    calculate an estimated time of arrival (ETA) of the data blocks to be synchronized using the dirty bytes counter, the pending dirty bytes counter, and the synchronization start time.

13. The system of claim 11, wherein the computer-executable instructions further cause the computing device to:
    calculate a synchronization progress of the data blocks to be synchronized using the dirty bytes counter and the pending dirty bytes counter.

14. The system of claim 8, wherein the computer-executable instructions further cause the computing device to:
    transmit another portion of the data blocks to be synchronized;
    receive another acknowledgement corresponding to the other portion of the data blocks;
    set another set of elements of the synchronization data structure corresponding to the other portion of the data blocks to clean;
    update the pending dirty bytes counter to an updated number of elements of the synchronization data structure set to dirty based on the other portion of the data blocks; and
    transmit the dirty bytes counter and the pending dirty bytes counter.

15. A non-transitory computer-readable medium comprising one or more computer-executable instructions that, when executed by at least one processor of a computing device, cause the computing device to:
    calculate a number of data blocks to be synchronized;
    set each element of a synchronization data structure to dirty;
    determine a dirty bytes counter, wherein the dirty bytes counter indicates a number of elements within the synchronization data structure that are set to dirty;
    transmit a portion of the data blocks to be synchronized;
    receive an acknowledgement corresponding to the transmitted portion of the data blocks;
    set a set of elements of the synchronization data structure corresponding to the transmitted portion of the data blocks to clean;
    determine a pending dirty bytes counter, wherein the pending dirty bytes counter indicates a current number of elements within the synchronization data structure that are set to dirty; and
    transmit the dirty bytes counter and the pending dirty bytes counter.

16. The non-transitory computer-readable medium of claim 15, wherein the computer-executable instructions further cause the computing device to:
    receive an indication to initiate a full synchronization of data.

17. The non-transitory computer-readable medium of claim 15, wherein the computer-executable instructions further cause the computing device to:
    merge the synchronization data structure and an active data structure, wherein the active data structure corresponds to new data blocks from an application of the computing device.

18. The non-transitory computer-readable medium of claim 15, wherein the computer-executable instructions further cause the computing device to:
    receive, by a gateway, the dirty bytes counter, the pending dirty bytes counter, and a synchronization start time.

19. The non-transitory computer-readable medium of claim 18, wherein the computer-executable instructions further cause the computing device to:
    calculate an estimated time of arrival (ETA) of the data blocks to be synchronized using the dirty bytes counter, the pending dirty bytes counter, and the synchronization start time.

20. The non-transitory computer-readable medium of claim 18, wherein the computer-executable instructions further cause the computing device to:
    calculate a synchronization progress of the data blocks to be synchronized using the dirty bytes counter and the pending dirty bytes counter.

* * * * *